A. NORDEEN.
PNEUMATIC PIANO.
APPLICATION FILED OCT. 31, 1907.
No. 916,764. Patented Mar. 30, 1909.
4 SHEETS—SHEET 1.
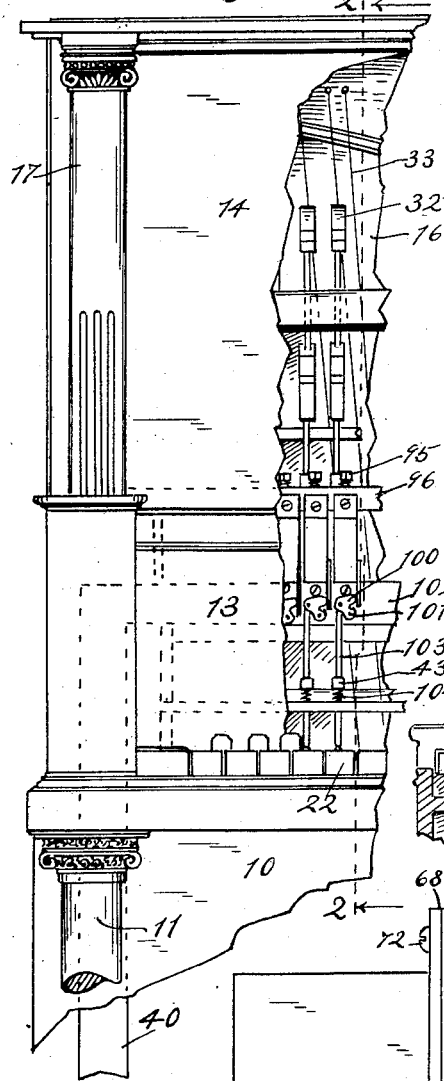
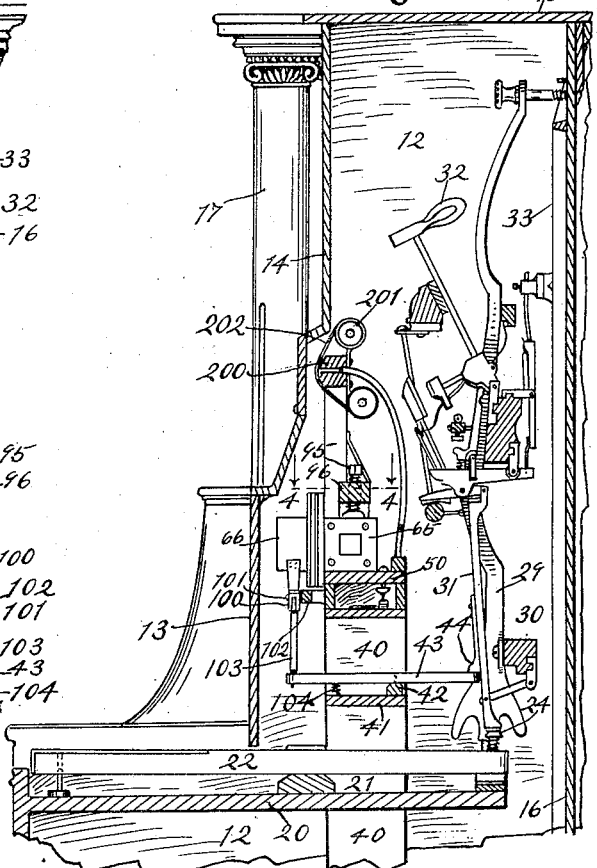
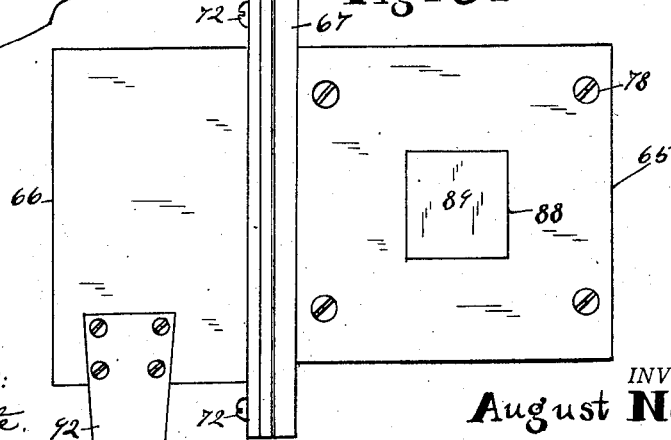
WITNESSES:
W. M. Gentle.
N. Allemong.
INVENTOR.
August Nordeen.
BY
V. H. Lockwood
ATTORNEY.

A. NORDEEN.
PNEUMATIC PIANO.
APPLICATION FILED OCT. 31, 1907.
916,764.
Patented Mar. 30, 1909.
4 SHEETS—SHEET 2.
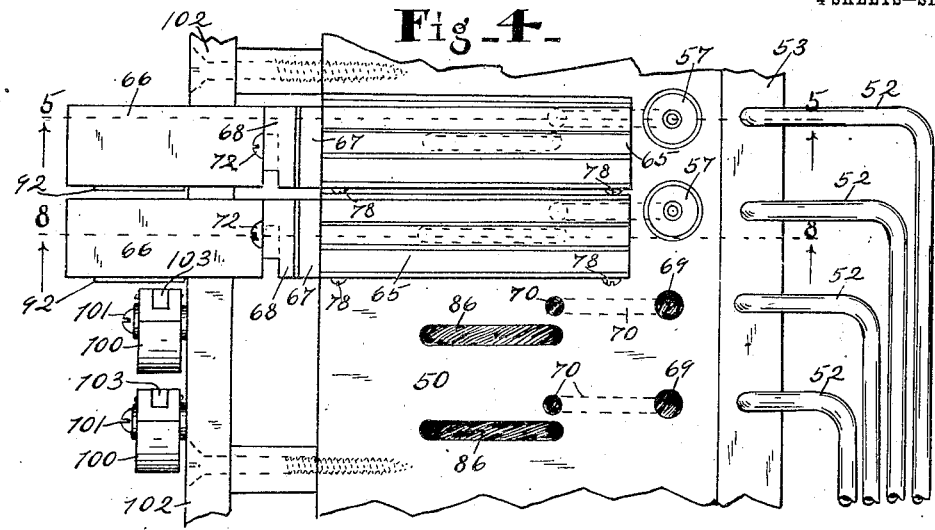
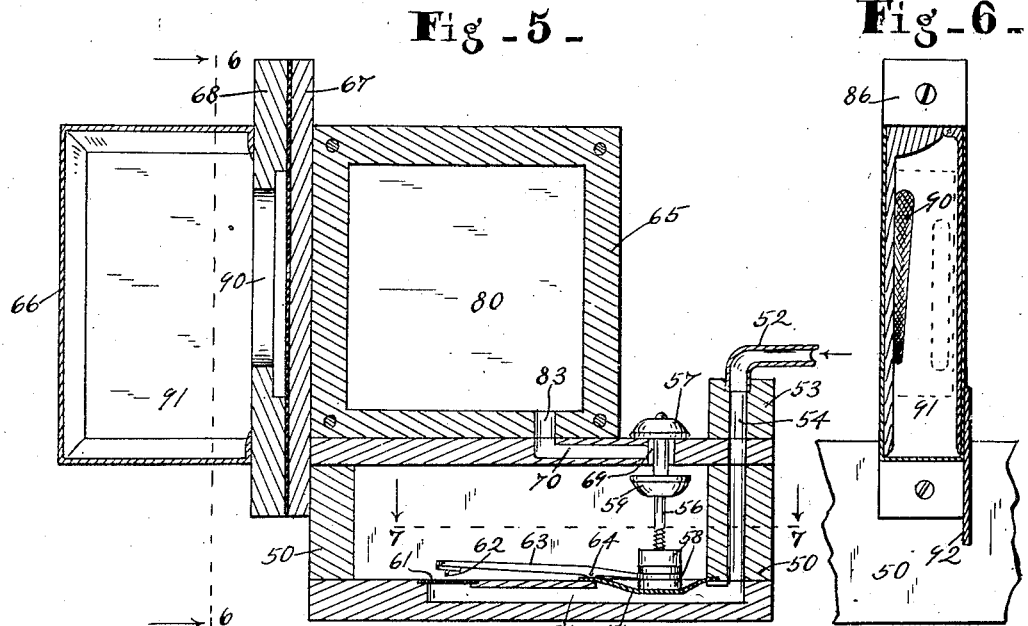
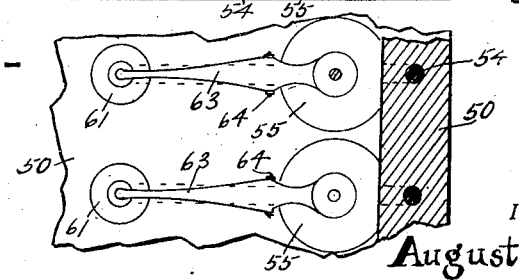
WITNESSES:
W. M. Gentle.
N. Allemong
INVENTOR.
August Nordeen.
BY
V. H. Lockwood
ATTORNEY.

A. NORDEEN.
PNEUMATIC PIANO.
APPLICATION FILED OCT. 31, 1907.
916,764.
Patented Mar. 30, 1909.
4 SHEETS—SHEET 3.
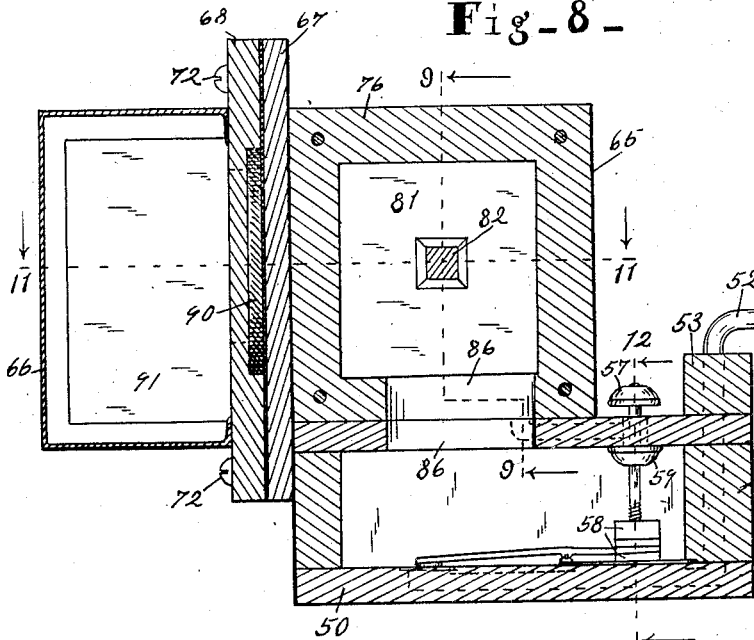
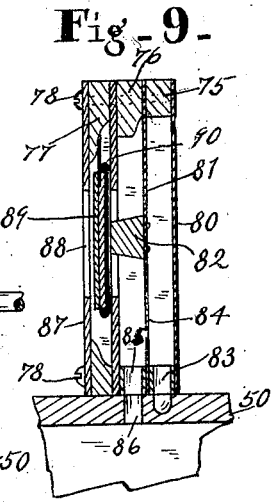
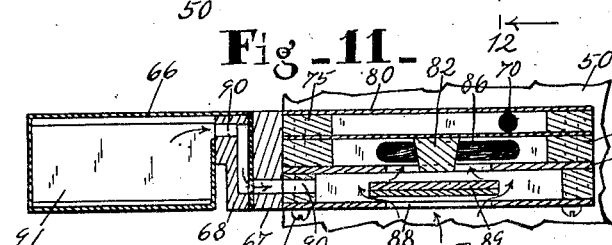
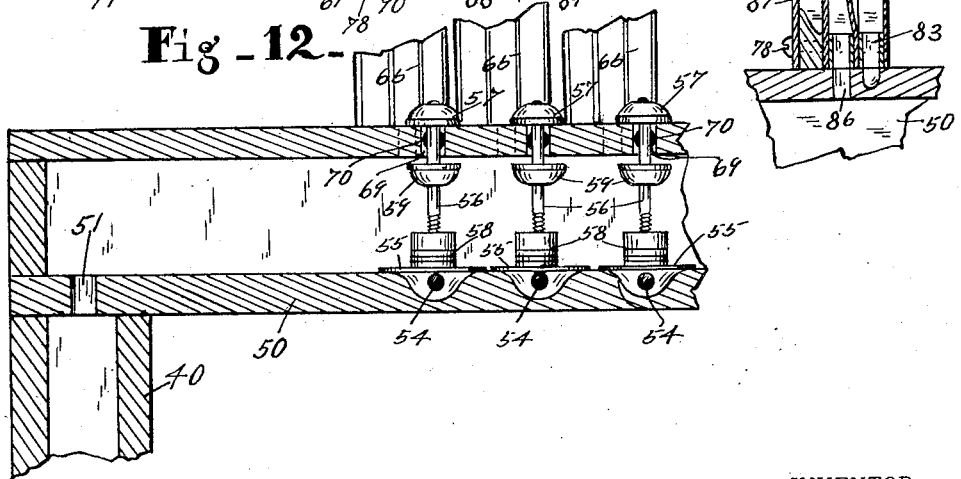
WITNESSES:
W. M. Gentle
N. Allemong
INVENTOR.
August Nordeen
BY
V. H. Lockwood.
ATTORNEY.

A. NORDEEN.
PNEUMATIC PIANO.
APPLICATION FILED OCT. 31, 1907.

916,764.

Patented Mar. 30, 1909.
4 SHEETS—SHEET 4.

WITNESSES:
W. M. Gentle
N. Allemong

INVENTOR.
August Nordeen
BY
V. H. Lockwood
ATTORNEY.

UNITED STATES PATENT OFFICE.

AUGUST NORDEEN, OF NEWCASTLE, INDIANA, ASSIGNOR TO RAY PIANO COMPANY, OF NEWCASTLE, INDIANA, A COPARTNERSHIP.

PNEUMATIC PIANO.

No. 916,764.　　　　Specification of Letters Patent.　　Patented March 30, 1909.

Application filed October 31, 1907. Serial No. 400,074.

*To all whom it may concern:*

Be it known that I, AUGUST NORDEEN, of Newcastle, county of Henry, and State of Indiana, have invented a certain new and useful Pneumatic Piano; and I do hereby declare that the following is a full, clear, and exact description thereof, reference being had to the accompanying drawings, in which like numerals refer to like parts.

The chief object sought to be accomplished by this invention is the production of a pneumatic piano wherein the individual pneumatic elements can be placed in a single row instead of many tiers or banks, as heretofore. To this end the pneumatic element is up-ended and made very narrow, no thicker than the corresponding piano key, and the movable member of the power pneumatic or bellows is arranged vertically so that the lower end will operate laterally and through suitable intermediate means operate the pneumatic key.

Another feature of my invention consists in the manner of mounting the pneumatic elements, namely clamping them all in place instead of otherwise securing them, so that by merely releasing a clamping screw bolt any one of them may be independently removed and replaced.

The full nature of the invention will be understood from the accompanying drawings and the following description and claim.

Figure 13:
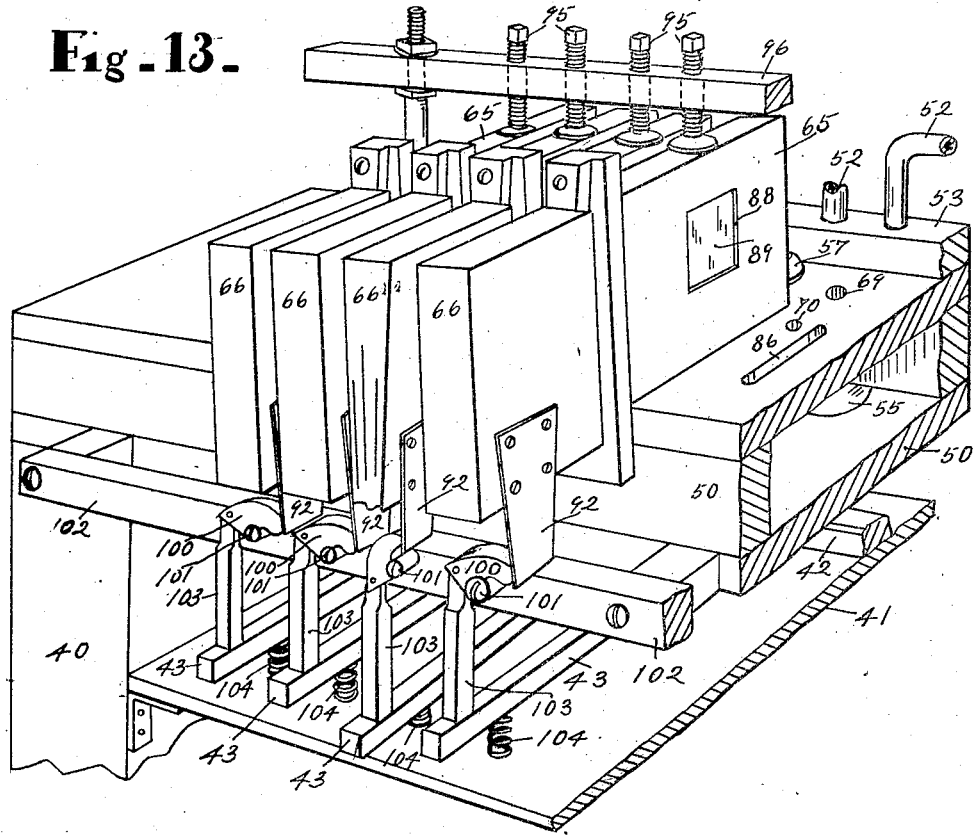
Figure 14:
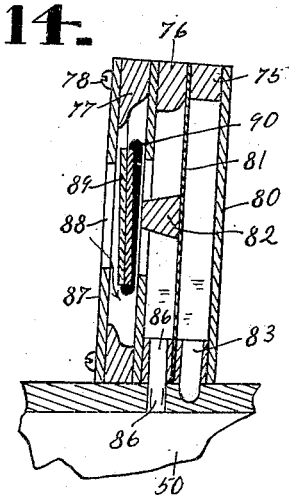

In the drawings Figure 1 is a front elevation of the left-hand end of a piano with the right-hand and lower portion broken away, and the front partly broken away to disclose the internal construction. Fig. 2 is a vertical transverse section through the upper part of a piano on the line 2—2 of Fig. 1. Fig. 3 is an elevation of the right-hand side of one of the pneumatic elements, the combination of a main pneumatic and a power pneumatic. Fig. 4 is a plan view of a portion of the air chamber and tracker board tubes with two of the pneumatic elements in place, parts being broken away, the parts appearing as viewed from the line 4—4 of Fig. 2 looking downward. Fig. 5 is a vertical transverse section through the air chamber and a pneumatic element on the line 5—5 of Fig. 4. Fig. 6 is a vertical section on the line 6—6 of Fig. 5 extending entirely through a power pneumatic. Fig. 7 is a horizontal section on the line 7—7 of Fig. 5, showing in plan view a pair of the valve mechanisms. Fig. 8 is a section through the parts shown in Fig. 5 along the line 8—8 of Fig. 4. Fig. 9 is a vertical section through a main pneumatic and the upper part of the air chamber on the line 9—9 of Fig. 8. Fig. 10 is the same as Fig. 9 with the secondary diaphragm actuated. Fig. 11 is a horizontal section through a pneumatic element on the line 11—11 of Fig. 8. Fig. 12 is a vertical longitudinal section through the right-hand end of the air chamber showing three valves and the lower part of the three main pneumatics on the line 12—12 of Fig. 8. Fig. 13 is a perspective view of a portion of the pneumatic mechanism in the piano, parts being broken away and other parts omitted. Fig. 14 is a view similar to Fig. 10 showing the pneumatic mounted in an inclined position.

In the particular construction exhibited in the drawings forming a part hereof for the purpose of explaining the general nature of my said invention, 10 represents the lower front wall of the piano casing with legs 11, an end wall 12, middle front wall 13, upper wall 14, top 15 and sounding board 16. There is an ornamental post 17 in the front upper part of the piano. The usual key-bed 20 extends horizontally thereof, and a balance rail 21 extends midway thereof on which the usual ivory piano keys 22 are mounted, with a capstan screw 24 extending up from the rear end thereof.

At the rear there are action brackets 29, a flange rail 30, and between them and in connection with said brackets, a piano action is mounted which may be of any usual type, one type thereof being shown herein for the purpose of making the invention plain, and it is provided with a sticker or abstract 31 that is actuated by the capstan 24 on each key of the piano. Since this invention does not relate particularly to the piano action, a detailed description thereof will be omitted excepting to say that the hammer 32 strikes the piano string 33.

The invention herein relates more particularly to pneumatic means for operating said piano actions in addition to and independently of the piano keys, and this invention is such that said pneumatic means may be located above the ordinary finger keys of the piano and occupy very little space, as seen in Fig. 2. As shown in said Fig. 2 there are vertical end parts 40 which carry a transverse key bed 41, something in the nature of the key-bed 20, and provided with a lever rail 42, something like the balance rail 21 below, and on that the levers 43 are fulcrumed the inner end of each lever fitting under a shoulder 44 on its corresponding sticker 31, or otherwise mounted so as to actuate the sticker. Each lever 43 is actuated by having its outer end depressed and, therefore, resembles in arrangement and operation the regular finger keys 22 of the piano. The pneumatic means for operating said levers 43 will now be described. There is an air chamber 50 extending transversely of the entire instrument with an air inlet port 51 at the right-hand end of the instrument, as shown in Fig. 12, through which air passes to the trunk 40, which is exhausted of air to any suitable bellows or other air-providing mechanism that is located in the lower part of the piano and which is not here shown, as this construction may be the same as in any other instrument of this kind. This air chamber, as shown in Fig. 2, is mounted on the trunk 40 over the finger-keys 22 and levers 43 and behind the middle wall 13 of the piano casing and in front of the stickers of the piano action. A suitable tracker board, 200 is located in the middle of the piano with rolls 201 for perforated music sheets 202. Air tubes 52 lead from the tracker board 200 through vertical apertures in the cross-strip 53 upon the rear portion of the top of the air chamber 50, as seen in Fig. 5. As in all other pneumatic instruments, there is one air tube 52 for each key of the piano, and through them air passes through the passageway 54 that extends down through the strip 53 and the rear wall of the air chamber 50, and along the bottom of the air chamber 50. The air thus entering elevates or actuates the primary diaphragm or pouch 55 that covers an opening or hole in the bottom of the air chamber 50 and which separates the air passageway 54 from the interior of the air chamber 50. Upon said diaphragm or pouch 55 the stem 56 of the primary valve 57 is supported by the blocks or disks 58. And on said stem there is a second valve 59. The upper part of the valve stem 56 passes through a vertical hole 60 in the top of the air chamber 50, and the valves 57 and 59 are spaced apart so that when they are in their downmost positions, the primary valve 57 will close the hole 69 from the outside air, and when said valve is in its uppermost position, outside air will be admitted, and at that time the second valve below will close the hole or passageway 69 from the air chamber 50 into said hole 69. The hole 69 is connected with the passageway 70, which will hereafter be explained. As seen in Fig. 5, the air passageway 54 is extended forward in the bottom of the air chamber 50 under a second small pouch or diaphragm 61, which has a bleed hole in it, and that bleed hole is cleaned by the point 62 and a lever 63 that is fulcrumed at 64 and is held between the two blocks 58 so that it will be actuated when the diaphragm 55 is actuated to keep the bleed hole clean.

There are in the instrument as many constructions, valves and passageways, such as are described in the preceding paragraph, as there are keys in the piano, and for each set of said valves and passageways, there is a pneumatic element composed of a main pneumatic 65, a power pneumatic 66 and their intermediate connecting plates 67 and 68, which are secured together by the screws 72. These parts, constituting one pneumatic element, are vertically disposed on the top of the air chamber 50 over the corresponding finger-key and lever 43, and are very narrow as compared with pneumatics heretofore employed in similar instruments, the width never exceeding the width of a finger-key on the piano, so that all of the pneumatic elements can be arranged in one horizontal row or bank, as indicated in Figs. 4 and 13, where only a few are shown, corresponding exactly with a single horizontal row or bank of finger-keys. In order to accomplish this advantage, the movable parts in these pneumatic elements are moved or operated laterally instead of vertically as heretofore. Each pneumatic element is mounted independently of the other on the air chamber 50 and held in place by the downward pressure upon their tops of the screw bolts 95 which are vertically adjustable in a cross-bar 96. This bar 96 extends entirely across the piano, but there is one of the screws 95 for each pneumatic element. Therefore, said pneumatic elements are separately removable for repairing or replacing.

Each main pneumatic consists, as seen in Figs. 9, 10, and 11, of three parts or members 75, 76, and 77 secured together. They are thin wooden frames, the middle one 76 being rigidly secured to the bar 67 and the other two being secured on each side of the middle, all being fastened together by screws 78 that pass through the three parts. The part 75 of the main pneumatic consists essentially of a rectangular frame with a large central opening, as shown in Fig. 9, and on the outside of the frame there is a flexible air proof covering 80, and on the inside of the frame there is a secondary pouch or diaphragm 81 formed of leather or similar flexible material and carrying on its center the block 82. These parts form a chamber, as shown in Fig. 9, and into it the opening or port 83 through the bottom leads from the air passageway 70, see Figs. 5 and 9.

The middle member 76 of the main pneumatic is likewise a rectangular frame with a rigid plate 84 on one side thereof, said plate being centrally perforated to permit the block 82 to extend and operate through it. There is an elongated opening 85 in the lower part of the member 76 that registers with an elongated opening 86 in the top of the air chamber 80. The other member 77 of the main pneumatic is a rectangular frame with a rigid plate 87 on the outside thereof with a central opening 88 that is closed by the secondary valve 89. This secondary valve is a flat valve suspended at the top within the member 77 and hanging on the inside of the opening 88. The main pneumatic has its lower surface slightly beveled preferably as in Fig. 14, that is not at an exact right angle to the sides thereof, so that when mounted, it will lean slightly toward the left when viewed from the front, as in Fig. 14, the purpose of this leaning position being to enable gravity to hold the valve 89 normally open.

The purpose of the secondary pouch or diaphragm 81 and block 82 is to hold said secondary valve 89 positively closed, as shown in Fig. 10, when the air enters the chamber in the member 75 of the main pneumatic. There is a passageway 90 at the front end of the member 77 of the main pneumatic, see Fig. 11, that passes on through the members 67 and 68 into the power pneumatic 66. The power pneumatic consists of a stationary portion and a vertically disposed flexible portion 91 hinged at the top with the lower end free for lateral movement, said power pneumatic being practically a bellows with the operating end extending downwardly, and on its lower end there is a projecting plate 92 that, when the bellows is collapsed, engages the rocker 100 pivoted at 101 to a bar 102 carried on the front side of the air chamber 50 and parallel therewith. The movement of the rocker 100 forces the push rod 103 downwardly, and thus the lever 43 is actuated, said lever being held in its normal position by a spring 104.

In operation the power pneumatic or bellows is relaxed and expanded by reason of its communication with the passageway 90, when the opening 88 is closed by the secondary valve 89, as appears in Fig. 10. When, however, air passes through the tracker board 200 in the well known way, it operates the primary valve 57, letting air in from the outside through the passageway 70 into the chamber 75 in the main pneumatic, and the suction in the main air chamber 50 moves the secondary pouch or diaphragm 81, as shown in Fig. 10, to forcibly close the secondary valve, 89 as shown therein, so that the suction acts through the slots 86 in the top of the air chamber 50, slot 85 in the middle member 76, and passage 90 in member 77, see Figs. 10 and 11, to exhaust the bellows or power pneumatic 66 and cause the actuation of the lever 43.

When the opening in the tracker board is closed and no air passes through the tube 52, the primary valve 57 closes to the position shown in Fig. 5, and the exhaust acting on both sides of the secondary diaphragm 81 permits it to resume its normal position, as shown in Fig. 9, and release the secondary valve 89, which permits the air on the outside, through the port 88, to again enter the bellows and relax it.

What I claim as my invention and desire to secure by Letters Patent is:

A pneumatic piano including an individual pneumatic element with a bellows-like power pneumatic vertically disposed so the movable member thereof moves laterally, a lever for each pneumatic element, a push rod in actuating engagement with said lever, a vertically oscillatory rocker pivotally connected for actuating said rod, and means extending from the movable end of the movable member of said power pneumatic for actuating said rocker.

In witness whereof, I have hereunto affixed my signature in the presence of the witnesses herein named.

AUGUST NORDEEN.

Witnesses:
 OLIVE BREEDEN,
 NELLIE ALLEMONG.